US012500418B2

(12) United States Patent
Nakasone et al.

(10) Patent No.: US 12,500,418 B2
(45) Date of Patent: Dec. 16, 2025

(54) SYSTEMS AND METHODS FOR OPTIMIZING ENERGY USAGE BASED ON USER PREFERENCES

(71) Applicant: Verizon Patent and Licensing Inc., Basking Ridge, NJ (US)

(72) Inventors: Mark Nakasone, Louisville, CO (US); Stephen Christian, Denver, CO (US); Damien Harsany, Highlands Ranch, CO (US); Abdul Fahim Rustamy, Richlandtown, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 467 days.

(21) Appl. No.: 18/058,369

(22) Filed: Nov. 23, 2022

(65) Prior Publication Data

US 2024/0170964 A1 May 23, 2024

(51) Int. Cl.
*H02J 3/14* (2006.01)
*H02J 3/32* (2006.01)

(52) U.S. Cl.
CPC ...... *H02J 3/14* (2013.01); *H02J 3/32* (2013.01); *H02J 2300/22* (2020.01)

(58) Field of Classification Search
CPC .. H02J 3/14; H02J 3/32; H02J 2300/22; H02J 2203/20; H02J 2300/24; H02J 3/003; H02J 3/004; H02J 2310/10; H02J 3/381
See application file for complete search history.

(56) References Cited

U.S. PATENT DOCUMENTS

| | | | |
|---|---|---|---|
| 2014/0018971 A1* | 1/2014 | Ellis | G06Q 50/06 700/297 |
| 2017/0317528 A1* | 11/2017 | Fife | H02J 3/003 |
| 2019/0139159 A1* | 5/2019 | Sarker | G06Q 30/08 |
| 2023/0155387 A1* | 5/2023 | Farrokhabadi | H02J 3/004 700/287 |
| 2023/0305587 A1* | 9/2023 | Thirumurthy | H02J 3/144 |
| 2024/0154414 A1* | 5/2024 | Wright | H02J 3/381 |

* cited by examiner

*Primary Examiner* — Mohammad Ali
*Assistant Examiner* — Dhruvkumar Patel

(57) ABSTRACT

An energy optimization platform may receive user preference information associated with operations of assets of a microgrid. The user preference information may identify user preferences regarding reducing cost, reducing an emission of carbon dioxide, and a resilience against a power outage. The assets may include at least one of one or more solar panels, one or more generators, or one or more batteries. The energy optimization platform may receive load forecast information regarding an electrical load. The energy optimization platform may provide the user preference information and the load forecast information as inputs to an energy model. The energy model predicts, as an output, operating states of the assets based on the user preference information and the load forecast information. The energy optimization platform may determine an optimized combination of the operating states and may provide, to a microgrid controller, optimization information regarding the optimized combination of the operating states.

20 Claims, 8 Drawing Sheets

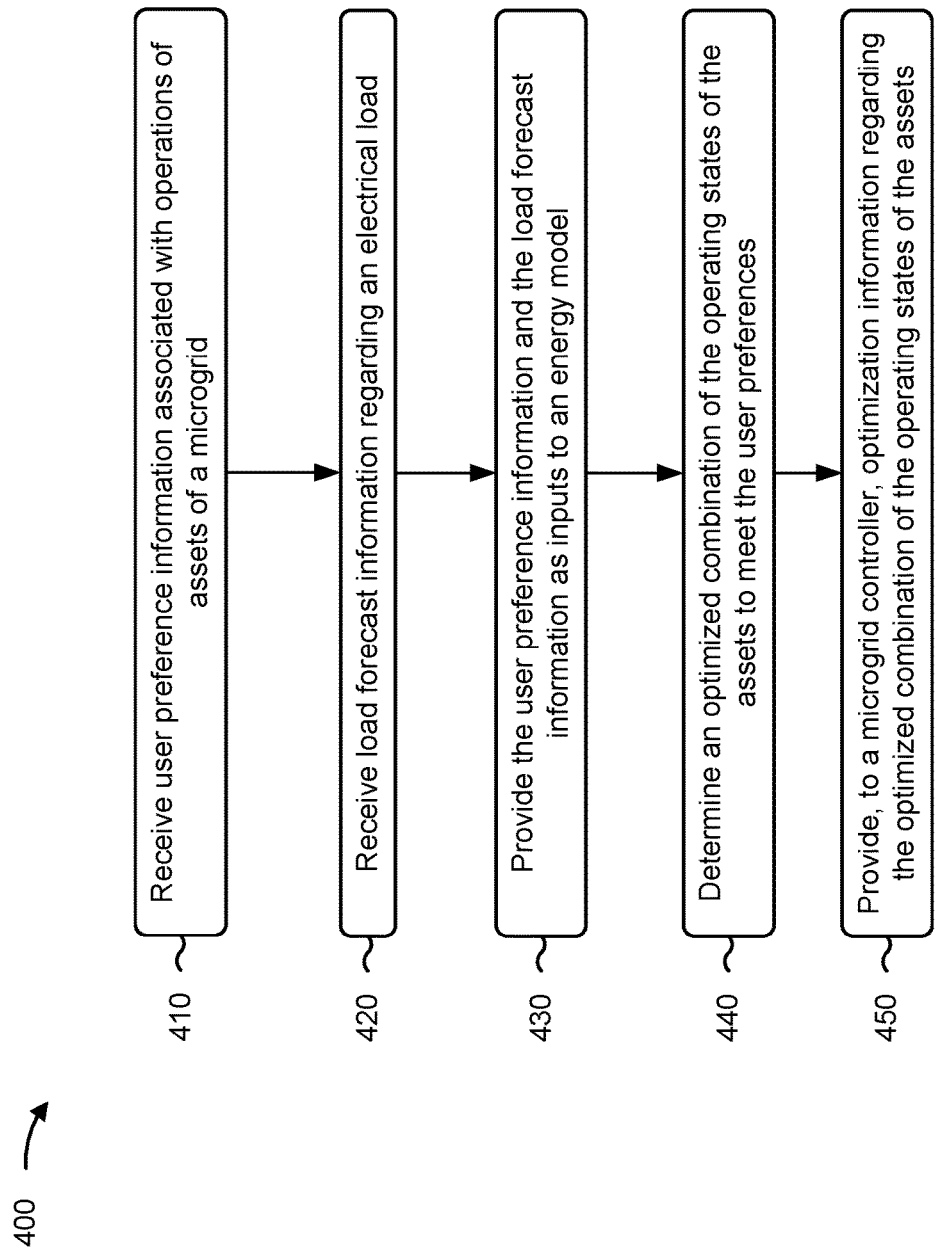

SYSTEMS AND METHODS FOR OPTIMIZING ENERGY USAGE BASED ON USER PREFERENCES

BACKGROUND

A microgrid may include various components, such as one or more solar panels, batteries, and generators. The microgrid may provide electrical power to devices or systems connected to the microgrid. A microgrid controller, connected to the microgrid, may provide commands to control operations of the components of the microgrid.

BRIEF DESCRIPTION OF THE DRAWINGS

FIG. 4 is a flowchart of an example process relating to optimizing energy usage based on user preferences.

DETAILED DESCRIPTION OF PREFERRED EMBODIMENTS

Figure 1A:
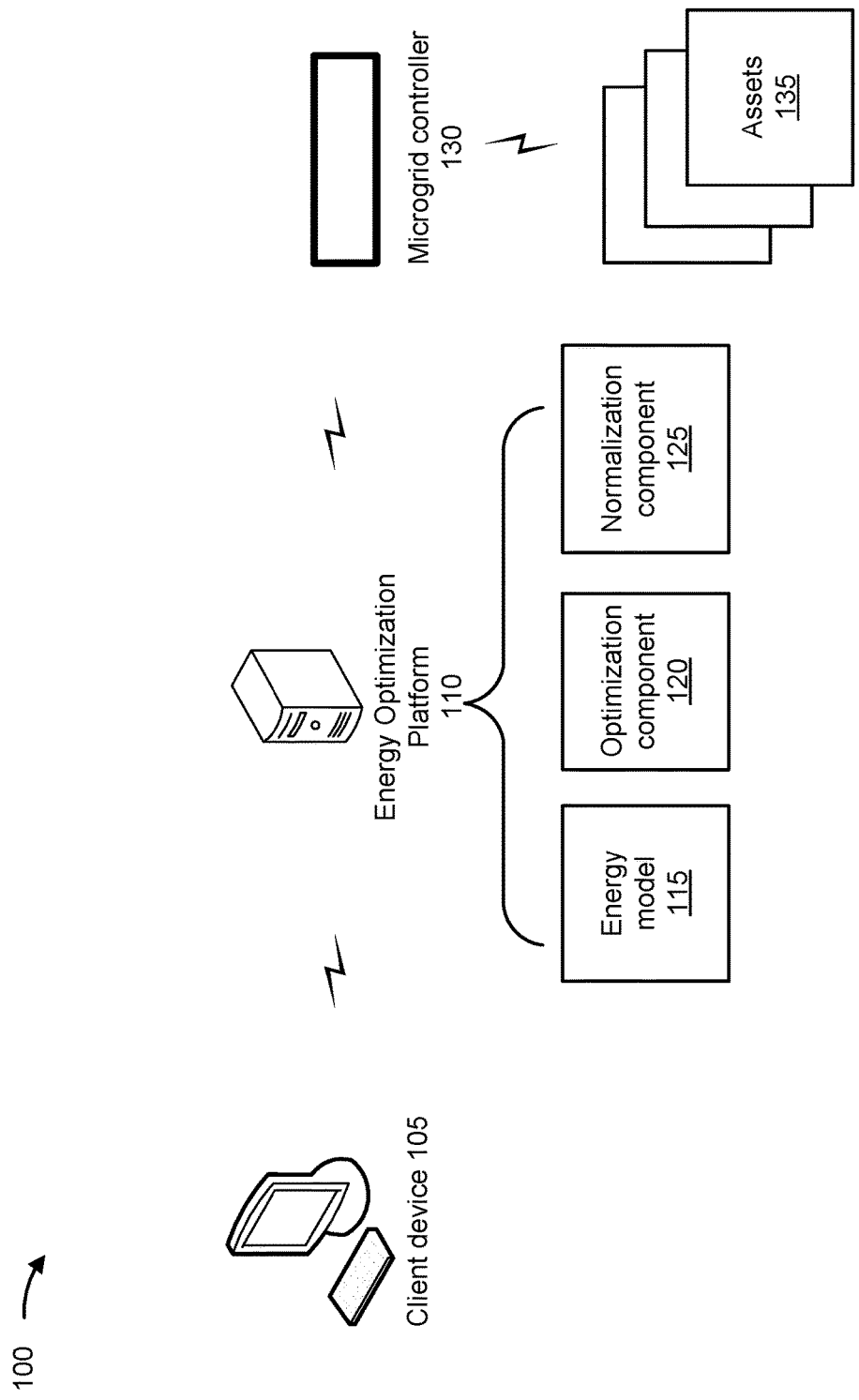
FIGS. 1A-1E are diagrams of an example associated with optimizing energy usage based on user preferences.

The following detailed description of example implementations refers to the accompanying drawings. The same reference numbers in different drawings may identify the same or similar elements.

An energy control system may be used to manage energy usage of a microgrid. The microgrid may include different components such as solar panels, generators, and batteries. Currently, such energy control systems are cost-oriented or rules-based. For example, an energy control system may control operations of components of a microgrid to reduce a cost associated with energy usage. Alternatively, a user may provide instructions (or rules) to the energy control system to control operations of the components of the microgrid. In some instances, the user may provide the instructions based on minimal to no insight regarding factors that affect the energy usage. The factors may include weather conditions (current and historical), historical loads on the microgrid, or historical capacities (e.g., a capacity of the microgrid), among other examples.

As a result of the minimal to no insight, the user may provide instructions that may cause the microgrid to operate under sub-optimal conditions. For example, based on the instructions from the user, the microgrid may generate an excessive amount of energy or may generate an insufficient amount of energy. The excessive amount of energy may be underutilized by elements or systems powered by the microgrid. Therefore, a portion of the excessive amount of energy may be wasted. Alternatively, the insufficient amount of energy may cause the elements or systems to operate improperly.

Implementations described herein are directed to managing energy usage of a microgrid based on user preferences. The user preferences may include preferences regarding reducing a cost (associated with energy generated by the microgrid), reducing an emission of carbon dioxide ($CO_2$) emissions, and enabling a resilience against a power outage of a power grid. As used herein, the term "energy" may include electrical power. As used herein, the term "resilience" may refer to an ability (e.g., of the microgrid) to provide electrical power to devices connected to the microgrid during a power outage of the power grid. The microgrid may include assets such as one or more solar panels, one or more generators, and/or one or more batteries. The assets may generate electrical power that is provided to an energy consumer, such as a data center, a commercial building, and/or a residential building, among other examples. "Power grid" (or "electrical grid") may refer to a network for delivering electricity (e.g., to consumers).

In some implementations, an energy optimization platform may receive user preference information identifying user preferences from a client device of a user associated with an energy consumer. A normalization component, of the energy optimization platform, may normalize values associated with the user preferences. As an example, the normalization component may determine a factor associated with each user preference based on a value associated with the user preference. The normalization component may use the factors associated with the user preferences to determine normalized values for the user preferences.

In some situations, additional information may be provided to the normalization component. The additional information may include cost information regarding costs associated with reducing an emission of carbon dioxide, storage capacity information regarding one or more storage capacities of the one or more batteries, resilience risk information regarding a risk tolerance with respect to the resilience, and/or sustainability budget information regarding a budget for reducing the emission of carbon dioxide. The user preference information and the additional information may identify constraints that are to be satisfied when the microgrid uses the assets to generate energy (e.g., to generate electrical power).

In some situations, the energy optimization platform may determine an electrical load (e.g., a predicted electrical load associated with the energy consumer). In some examples, the electrical load may be predicted based on historical electrical loads, current weather conditions, and/or historical weather conditions.

Normalized values (determined by the normalization component) and load forecast information identifying the electrical load may be provided as inputs to an energy model representing the microgrid. For example, the energy model may include elements identifying the assets of the microgrid and identifying connections between the assets (e.g., identifying electrical paths between the assets).

The energy model may be configured to provide, as an output, information regarding assets that may be used to generate energy to meet the electrical load in light of constraints (e.g., constraints associated with the user preferences). The energy model may be configured to provide, as an output, operating states of the assets of the microgrid (e.g., information identifying the operating states of the assets) based on the inputs. An operating state of an asset may indicate whether the asset is to generate (or is to be used to generate) energy (e.g., electrical power) to meet the user preferences and the electrical load and/or whether the asset is to store energy to meet the user preferences (e.g., with respect to resilience).

The energy model may be configured to provide, as the output, information identifying connections between the assets and/or information identifying one or more characteristics of the connections (e.g., an amount of electrical impedance). In some examples, the energy model may determine the operating states of the assets for a first period of time (e.g., a five-minute period, a ten-minute period, among other examples). For example, the operating state of an asset may indicate that the asset is to generate energy during the first period of time (or timestep).

The energy model may be configured to periodically redetermine the operating states of the assets to ensure that the operating states are meeting (or are being updated to continue to meet) the user preferences and the electrical load. For example, the energy model may be configured to redetermine the operating states based on the first period of time (e.g., redetermine the operating states every five minutes, every ten minutes, among other examples).

Additionally, or alternatively, to the normalized values and the load forecast information being provided as inputs to the energy model, additional inputs may be provided to the energy model. The additional inputs may include storage and generator information that includes solar capacity information regarding a capacity of the one or more solar panels, generator capacity information regarding a capacity of the one or more generators, and availability time information regarding availability times of the assets. The capacity of an asset may indicate an amount of energy stored by the asset.

The energy model may use the storage and generator information to provide, as an output, the operating states of the assets for a second period of time (e.g., a one-day period, a one-week period, among other examples). For example, the operating states may indicate that one or more batteries are to store a particular amount of charge for a one-day period (e.g., to meet the user preferences with respect to resilience and/or cost reduction). In this regard, the energy model may use the load forecast information to determine the operating states for shorter periods of time and use the storage and generator information to determine the operating states for longer periods of time. In some situations, based on the storage and generator information being provided as an input, the energy model may be configured to redetermine the operating states every day, over four days, among other examples.

In some implementations, the output of the energy model may be optimized by an optimization component of the energy optimization platform. For example, the optimization component may determine an optimized manner for utilizing the assets to meet the user preferences and meet the electrical load. For instance, the optimization component may determine an optimized combination of the operating states of the assets (e.g., an optimized combination of assets). The energy optimization platform may provide, to a microgrid controller of the microgrid, optimization information regarding the optimized combination of the operating states of the assets. The optimization information may be provided to cause the microgrid controller to control the operations of the assets based on the optimization information.

By determining the operating states of the assets as described herein, implementations described herein prevent the microgrid from generating an excessive amount of energy or generating an insufficient amount of energy, while optimizing for the preferences specified by a grid operator and/or consumer. Therefore, by determining the operating states of the assets as described herein, implementations described herein prevent a portion of the excessive amount of energy from being wasted and preserve resources that would have been used to remedy issues associated with generating an insufficient amount of energy, and achieve the desired operating preferences prioritized by the grid operator/consumer.

FIGS. 1A-1E are diagrams of an example 100 associated with optimizing energy usage based on user preferences. As shown in FIGS. 1A-1E, example 100 includes a client device 105, an energy optimization platform 110, a microgrid controller 130, and assets 135 of a microgrid. Assets 135 may be referred to individually as asset 135.

Client device 105 may include one or more devices configured to provide information associated with optimizing energy usage based on user preferences, as described herein. The user preferences may include preferences regarding reducing a cost (associated with energy generated by the microgrid), reducing an amount of carbon dioxide ($CO_2$) emissions, and enabling a resilience against a power outage of a power grid. For example, client device 105 may provide the information to energy optimization platform 110. In some examples, client device 105 may be a device of an administrator of an energy consumer (e.g., an administrator of a data center, a commercial building, and/or a residential building, among other examples).

Energy optimization platform 110 may include one or more devices capable of receiving, generating, storing, processing, and/or providing information associated with optimizing energy system activities—e.g., production, storage, usage—based on user preferences, as described elsewhere herein. As shown in FIG. 1A, energy optimization platform 110 includes an energy model 115, an optimization component 120, and a normalization component 125.

Energy model 115 may include a model that includes elements representing the microgrid. For example, energy model 115 may include elements representing the assets, representing connections between the assets (e.g., electrical paths between the assets), and/or representing interactions between the assets. In other words, energy model 115 may model a layout of the microgrid. Additionally, energy model 115 may represent characteristics of the connections (e.g., an amount of electrical impedance on each electrical path, a cost associated with using each electrical path, an amount of power expected to be provided via each electrical path, among other examples).

In some examples, energy model 115 may be a heuristic model. Alternatively, energy model 115 may be a machine learning model. In some implementations, energy model 115 may receive, as inputs, user preference information identifying the user preferences and load forecast information regarding an electrical load. Based on the inputs, energy model 115 may provide, as an output, information regarding assets that may be used to supply energy to meet the electrical load in light of constraints associated with the user preferences, as explained herein.

Optimization component 120 may include one or more devices configured to optimize the output provided by energy model 115. For example, optimization component 120 may be configured to determine an optimal combination of assets (out of the assets identified by energy model 115) and an optimal combination of connections between the assets to provide energy to meet the electrical load in light of constraints associated with the user preferences. In some implementations, optimization component 120 may include a linear program that is used to optimize the output provided by energy model 115. For example, optimization component 120 may utilize linear programming to optimize the output provided by energy model 115.

Normalization component 125 may include one or more devices configured to normalize values that may be used as constraints by energy model 115 and/or by optimization component 120. As an example, the values may be values associated with the user preferences.

Microgrid controller 130 may include one or more devices configured to control operations of assets 135 of the microgrid. For example, microgrid controller 130 may provide one or more commands to cause one or more assets 135 to generate energy, store energy, and/or receive energy (e.g., recharge). In some examples, an asset 135 may include a solar panel, a battery, or a generator (e.g., a diesel generator, a hydrogen generator, among other examples). In some examples, assets 135 may generate energy that is provided to the energy consumer.

Figure 1B:
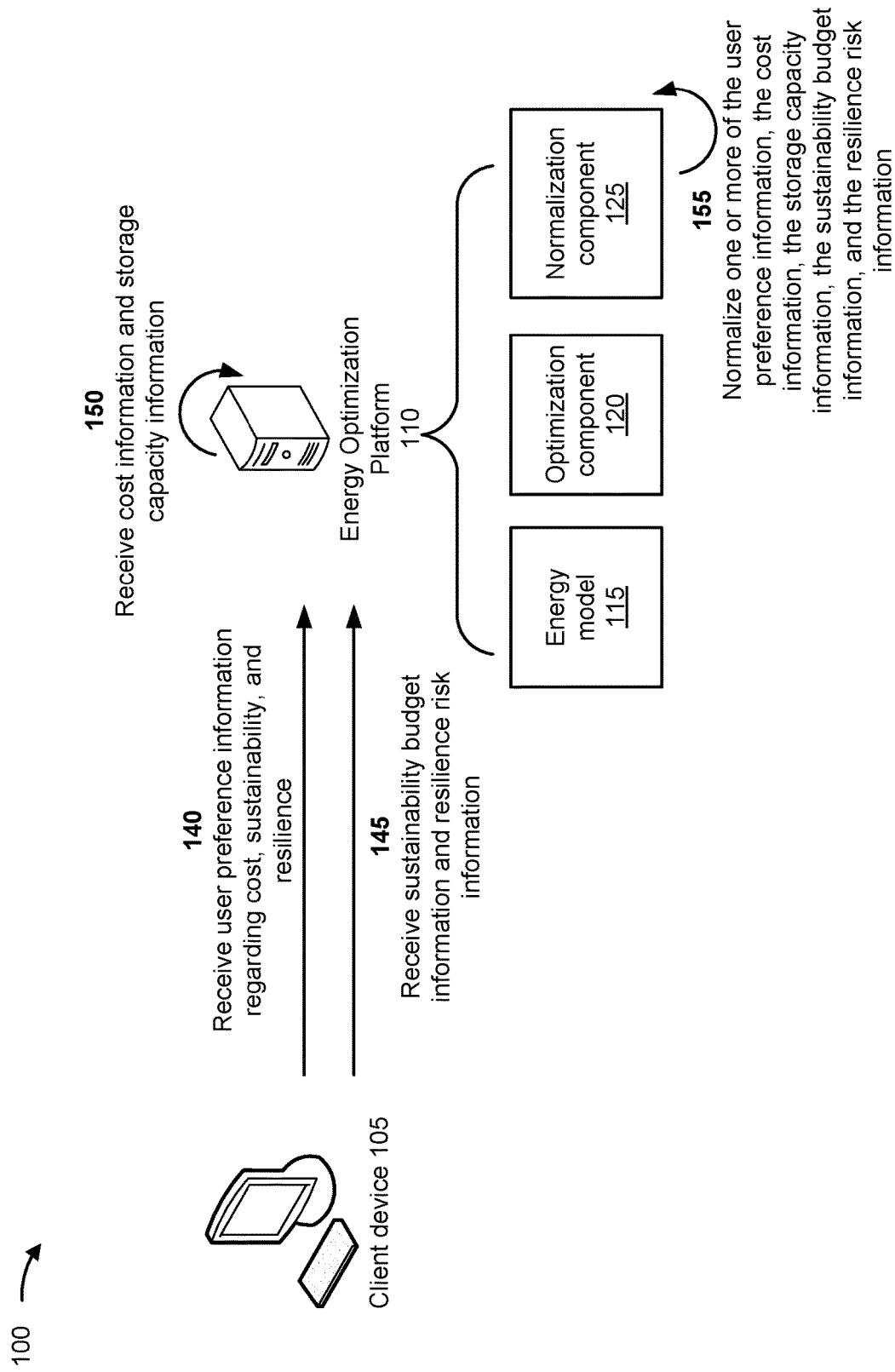

As shown in FIG. 1B, and by reference number 140, energy optimization platform 110 may receive user preference information regarding cost, sustainability, and resilience. For example, energy optimization platform 110 may receive the user preference information from client device 105. For example, client device 105 may provide, to energy optimization platform 110, a request to optimize a manner in which energy is generated by the microgrid to provide energy to meet a load associated with the energy consumer (e.g., an amount of electrical power to be consumed by the energy consumer). The user preference information may identify user preferences that include a cost preference regarding reducing a cost (associated with energy generated by the microgrid), a sustainability preference regarding reducing an emission of carbon dioxide, and a resilience preference regarding a resilience against a power outage of a power grid. In this regard, the user preferences may identify constraints with respect to a manner in which assets 135 are used to generate energy.

In some examples, the user preference information may be provided in the form of percentages. For example, the user preference information may identify a first percentage for the cost preference, a second percentage regarding the sustainability preference, and a third percentage regarding the resilience preference. A magnitude of a percentage of a user preference may indicate a priority of the user preference with respect to other preferences. For example, a value of 66% for the resilience preference, a value of 20% for the cost preference, and a value of 14% for the sustainability preference may indicate that the resilience preference is to be prioritized over the cost preference and the sustainability preference, and that the cost preference is to be prioritized over the sustainability preference.

Continuing with the example above, based on the user preferences, energy optimization platform 110 may determine that 66% of a capacity of a battery (e.g., an asset 135) is to be used for resilience, 20% of the capacity of the battery is to be used to reduce cost, and 14% of the battery is to be used to reduce carbon dioxide emission. In this regard, the 20% of the capacity of the battery may be used to supply energy (e.g., to the energy consumer) and to enable the energy consumer to become independent from the power grid, thereby reducing or potentially eliminating a cost associated with using the power grid.

In some examples, a value for the resilience preference may indicate a portion of a capacity (e.g., of the one or more batteries or generators) to be allocated for resilience (e.g., allocated for use during a power outage). While the example provided herein utilizes percentages, other forms and values may be used to indicate the user preference.

As shown in FIG. 1B, and by reference number 145, energy optimization platform 110 may receive sustainability budget information and resilience risk information. For example, energy optimization platform 110 may receive the sustainability budget information and the resilience risk information from client device 105. The sustainability budget information and the resilience risk information may identify constraints with respect to a manner in which assets 135 are used to generate energy. In some examples, the sustainability budget information may include information regarding a budget for reducing the emission of carbon dioxide. For example, the budget may indicate an amount of money that the administrator is willing to spend to reduce the emission of carbon dioxide. The resilience risk information may include information regarding a risk tolerance with respect to the resilience. In some examples, the risk tolerance may indicate an amount by which the portion of the battery charge capacity (reserved for use during the power outage) may be reduced or reallocated.

As shown in FIG. 1B, and by reference number 150, energy optimization platform 110 may receive cost information and capacity information. For example, energy optimization platform 110 may receive the cost information and the capacity information from client device 105 or other sources. The cost information may include information regarding costs associated with the usage of the one or more energy sources (e.g., generators, batteries, third party providers), cost information may include current or historical fuel costs, current or historical maintenance costs, current or historical failure-related costs (e.g., replacement costs), and the like. The cost information may include a time component that reflects the variability of costs over time periods (e.g., time of day, day of week, week of year, etc.). As an example, the cost information may include information regarding costs associated with reducing an emission of carbon dioxide such as from the usage of one or more solar panels or batteries as energy sources. The capacity information may include information regarding one or more storage capacities of the one or more batteries, generation capacity of one or more generators, generation capacity of one or more solar panels, failure/maintenance rates (that may impact available capacity), regulatory limits on operation times, and the like.

As shown in FIG. 1B, and by reference number 155, energy optimization platform 110 may normalize one or more of the user preference information, the cost information, the capacity information, the sustainability budget information, and the resilience risk information. For example, energy optimization platform 110 may use normalization component 125 to normalize values identified by one or more of the user preference information, the cost information, the capacity information, the sustainability budget information, and/or the resilience risk information to generate normalized information. Because magnitudes of the values may significantly vary from one type of information to another type of information, the magnitudes of the values may be normalized to a particular range (e.g., a range between 0 and 1). Normalizing the values may enable the constraints (associated with the different types of information) to be appropriately considered (e.g., across different assets 135) when optimizing the usage of assets 135 to generate power to meet a load of the energy consumer.

In some examples, as part of normalizing the values associated with the user preferences, normalization component 125 may determine factors such as a first factor associated with reducing cost, a second factor associated with reducing the emission of carbon dioxide, and a third factor associated with resilience. In some examples, normalization component 125 may determine the factors such that a combination of the factors (e.g., a sum of the factors) is equal to 1. Each factor may correspond to a weight associated with a respective user preference.

As an example, normalization component 125 may determine the first factor using the following formula:

$$C_{cost}(c) = c_{cost} * F_{COST} \forall c \in C$$

where C represents a set of assets 135, where c represents one of the assets 135, where $c_{cost}$ represents a marginal cost of the asset 135, and where $F_n$ represents the value of the first factor where $n \in$ [COST, RESIL, SUSTAIN], $0 \le F_n \le 1$.

To determine the first factor, the formula is iterated with respect to all assets 135 (of the set of assets 135) by multiplying a marginal cost of an asset 135 by the first factor.

As another example, normalization component 125 may determine the second factor using the following formula:

$$K_{co2}(k) = k_{co2} * F_{SUSTAIN} \, \forall k \in K$$

where K represents a set of carriers of carbon dioxide, k represents a carrier, $k_{co2}$ represents a carbon dioxide emission of the carrier, and $F_n$ represents the value of the second factor where $n \in$ [COST, RESIL, SUSTAIN], $0 \le F_n \le 1$.

To determine the second factor, the formula is iterated with respect to all carriers (of the set of carriers) by multiplying a carbon dioxide emission of a carrier by the second factor. "Carrier" may be used to refer to an element that emits (or produces) carbon dioxide, such as a generator.

As yet another example, normalization component 125 may determine the third factor using the following formula:

$$S_{emergency} = S_{capacity} * F_{RESIL} \, \forall s \in S$$

where S represents a set of elements that can store energy, s represents one of the storage elements, $s_{capacity}$ represents the storage capacity of the storage element, and F represents the value of the third factor where $$n \in [\text{COST}, \text{RESIL}, \text{SUSTAIN}], 0 \le F_n \le 1.$$

The elements that can store energy may include the one or more batteries. In this regard, the third factor is applied to a portion of a battery (e.g., a portion of a charge of the battery) that is dedicated to resilience. In this regard, a capacity of the portion of the battery is based on a total capacity of the battery multiplied by the third factor. The portion of the battery may be allocated to resilience in the event of a power outage of the power grid.

In some examples, normalization component 125 may determine a marginal cost of an asset 135 using the following formula:

$$C_{3fo}(c) = \left( \frac{c_{cost} * F_{COST}}{\sqrt{\sum_{c \in C} c_{cost}^2}} \right) + \left( \frac{K_c * F_{SUSTAIN}}{\sqrt{\sum_{k \in K} k_{co2}^2}} \right) \forall c \in C$$

where C represents the set of assets 135 with marginal costs and carriers of carbon dioxide, c represents one of the assets 135, $c_{cost}$ represents a marginal cost of the asset 135, K represents the set of carriers of carbon dioxide, k represents one of the carriers, $k_{co2}$ represents carbon dioxide emission of the carrier, Kc represents the carbon dioxide emissions of the asset 135, and F represents the factor value where $n \in$ [COST, RESIL, SUSTAIN], $0 \le F_n \le 1$.

In some examples, normalization component 125 may normalize a marginal cost of an asset 135 to a range (e.g., between 0 and 1) based on the marginal costs of all assets 135. For example, normalization component 125 may determine a sum of the squares of the marginal costs associated with using assets 135 using the following formula:

$$N_{cost}(C) = \sqrt{\sum_{c \in C} c_{cost}^2}$$

where C represent a set of assets 135 and $c_{cost}$ represents the marginal cost of an asset 135.

Normalization component 125 may normalize a marginal cost of an asset 135 by dividing the marginal cost of the asset 135 by the sum of the marginal costs associated with using assets 135. For example, normalization component 125 may determine the normalized marginal cost of the asset 135 using the following formula:

$$C_{norm}(c) = \frac{c_{cost}}{N_{cost}(C)} \, \forall \, c \in C$$

where C represents the set of assets 135, c represents one of the assets 135, $c_{cost}$ represents the marginal cost of the asset 135, and $N_{cost}(C)$ represents the sum of the squares of the marginal costs associated with using assets 135.

In some examples, normalization component 125 may normalize the carbon dioxide emission of an asset 135 to a range (e.g., between 0 and 1) based on the carbon dioxide emission of all assets 135. For example, normalization component 125 may determine a sum of the squares of the carbon dioxide emissions associated with using the carriers using the following formula:

$$N_{co2}(K) = \sqrt{\sum_{k \in K} k_{co2}^2}$$

where K represents the set of carriers and $K_{co2}$ represents a carbon dioxide emission of a carrier.

Normalization component 125 may normalize a carbon dioxide emission of an asset 135 by dividing the carbon dioxide emission of the asset 135 by the sum of the carbon dioxide emission associated with using the carriers. Normalization component 125 may determine the normalized carbon dioxide emission of the asset 135 using the following formula:

$$K_{norm}(c) = \frac{c_{co2}}{N_{co2}(K)} \, \forall \, c \in K$$

where K represents the set of carriers, c represents one of the carriers, $c_{co2}$ represents the carbon dioxide emission of the carrier, and $N_{co2}(K)$ represents the sum of the carbon dioxide emission associated with using the carriers.

Figure 1C:
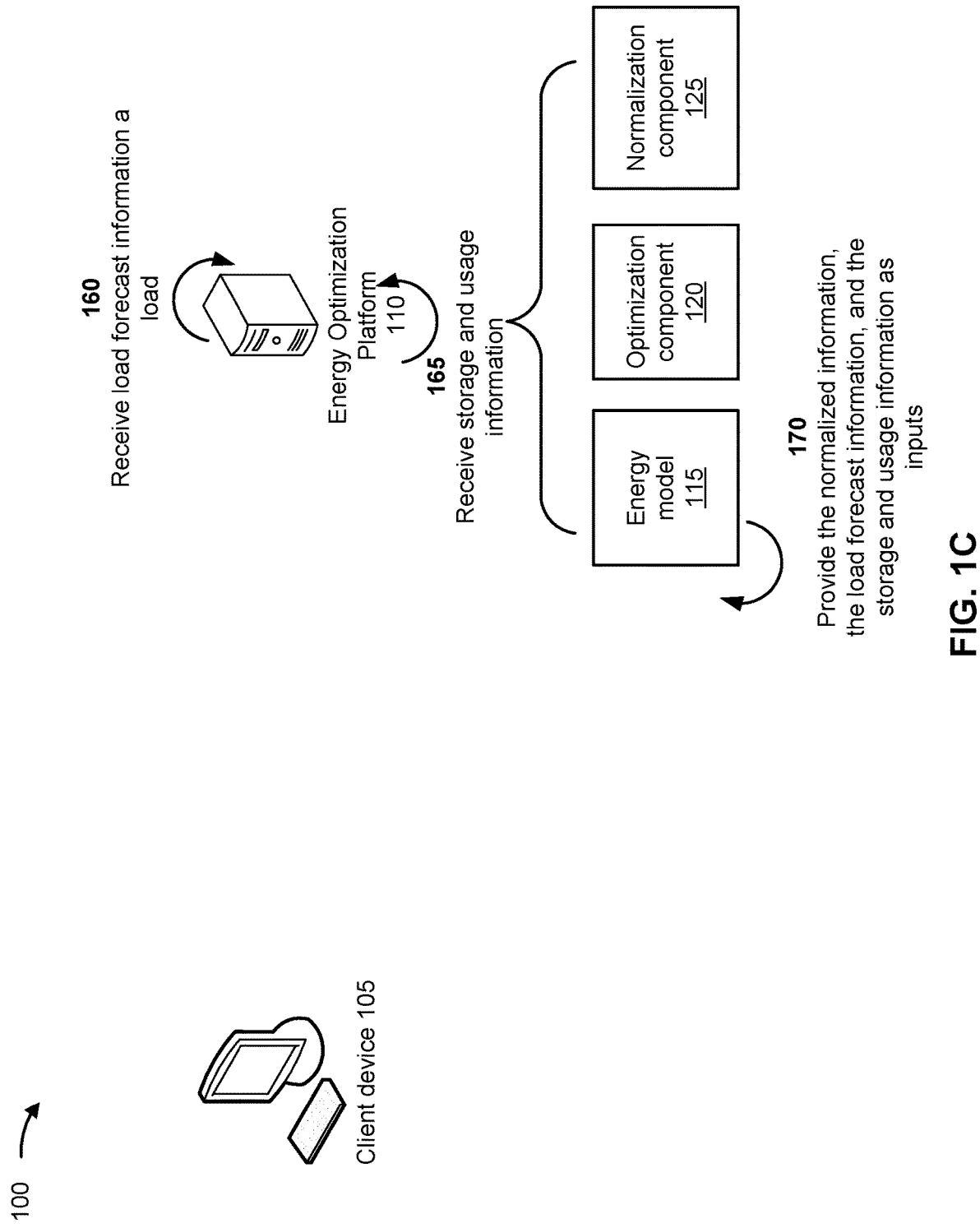

As shown in FIG. 1C, and by reference number 160, energy optimization platform 110 may receive load forecast information regarding a load. The load may be an electrical load associated with the energy consumer. In some implementations, energy optimization platform 110 may receive the load forecast information from client device 105. In some examples, the load forecast information may be determined based on historical electrical loads associated with the energy consumer. In some implementations, load forecast information may include past or current weather conditions associated with a location of the microgrid, and/or historical weather conditions associated with the location of the microgrid (e.g., where such information may impact the energy usage by grid consumers).

Energy optimization platform 110 may be configured to determine a combination of assets 135 to generate sufficient electrical power to meet the electrical load while meeting the user preferences and/or other constraints discussed herein. In this regard, the load forecast information may be provided as an input to energy model 115. In some implementations, energy optimization platform 110 may periodically redetermine the combination of assets 135 to ensure that the electrical power is generated in a most efficient manner by the microgrid while meeting the user preferences and/or other constraints discussed herein.

As shown in FIG. 1C, and by reference number 165, energy optimization platform 110 may receive storage and usage information. In some implementations, energy optimization platform 110 may receive the storage and usage information from client device 105. In some examples, the storage and usage information may include solar capacity information regarding a capacity of each of the one or more solar panels, generator capacity information regarding a capacity of each of the one or more generators, and availability information regarding availability times of assets 135.

The storage and usage information may be provided as an input to energy model 115 to enable energy model 115 (and/or optimization component 120) to identify assets 135 that are to generate energy to meet the user preference and/or meet a particular load associated with the energy consumer. In some implementations, the storage and usage information may represent a long term forecast for the capacities of assets while the load forecast information represents a short term forecast for the load, as explained herein.

The capacities of the one or more solar panels may be generated based on historical capacities of the one or more solar panels, a historical radiance at a location of the one or more solar panels, historical weather conditions at the location of the one or more solar panels, and a historical failure rate of the one or more solar panels. In some examples, the solar capacity information may identify a long-term load forecast that is based on historical loads associated with the energy consumer and historical weather conditions associated with the location of the one or more panels.

In some examples, the generator capacity information may be based on historical fuel costs associated with the one or more generators, historical maintenance costs associated with the one or more generators, and historical failure rates associated with the one or more generators.

As shown in FIG. 1C, and by reference number 170, energy optimization platform 110 may provide the normalized information, the load forecast information, and the storage and usage information as inputs. For example, the normalized information, the load forecast information, and the storage and usage information may be provided as inputs to energy model 115.

Figure 1D:
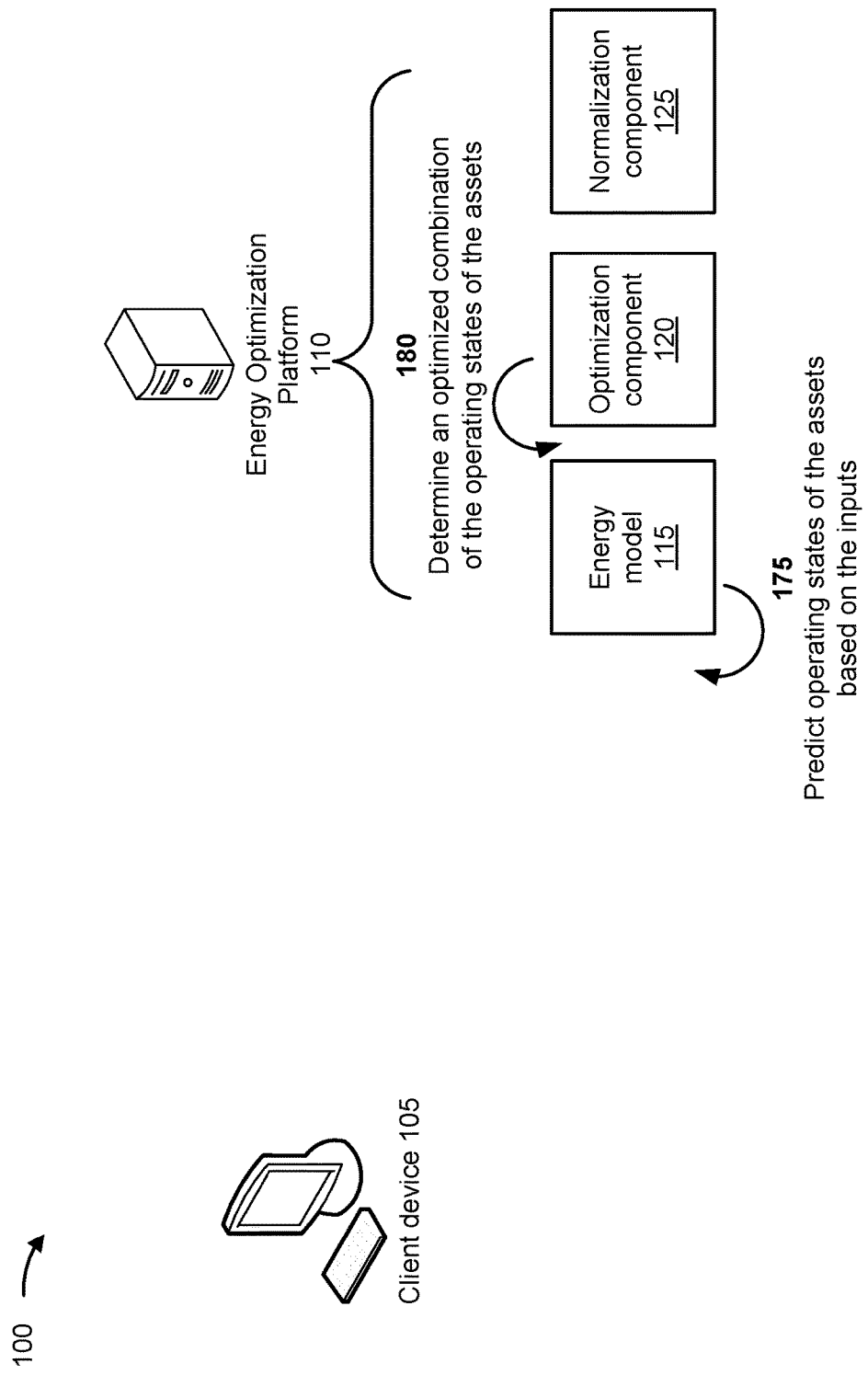

As shown in FIG. 1D, and by reference number 175, energy optimization platform 110 may determine operating states of the assets based on the inputs. For example, energy optimization platform 110 (e.g., using energy model 115) may predict the operating states. For instance, energy model 115 may identify a set of assets 135 that may be used to produce energy that meets the electrical load while meeting the user preferences. In this regard, energy model 115 may determine the operating states of the set of assets 135 that indicate that the set of assets 135 are to generate energy to meet the user preferences and the electrical load.

In some implementations, energy optimization platform 110 may predict the operating states based on weather conditions associated with the microgrid (e.g., the historical weather conditions and the current weather conditions discussed herein). For example, energy model 115 may determine (or predict) a manner in which the weather conditions affect operations of all assets 135. In other words, energy model 115 may model behaviors of all assets 135 based on the weather conditions. Energy model 115 may select the set of assets 135 based on the manner in which the weather conditions affect the operations of all assets 135. Additionally, or alternatively, energy model 115 may select the set of assets 135 based on the manner in which temperature and/or radiance affect the operations of all assets 135 in a similar manner.

Additionally, or alternatively, energy model 115 may select the set of assets 135 based on the manner in which impedance of connections between assets 135 (e.g., electrical paths between assets 135) affect an amount of energy provided via the connections. In this regard, energy model 115 may identify a set of connections between the set of assets 135 to be used to provide the energy generated by the set of assets 135.

Energy model 115 may model behaviors of the set of assets 135 and the set of connections based on the inputs provided to energy model 115. In this regard, energy model 115 may model behaviors of the set of assets 135 and the set of connections to determine (or predict) costs associated with using the set of assets 135, determine carbon dioxide emissions associated with using the set of assets 135, determine capacities of the set of assets 135 that are allocated to resilience, and/or determine the availability times associated with the set of assets 135. Energy model 115 may model the cost associated with the set of assets 135 based on the historical fuel cost, the historical maintenance cost, and/or the historical failure rates discussed herein.

Energy model 115 may provide, as an output, information regarding the set of assets 135 and information regarding the set of connections. The information regarding the set of assets 135 may identify the set of assets 135, the operating states of the set of assets 135, the costs associated with using the set of assets, the carbon dioxide emissions associated with using the set of assets 135, and/or the capacities of a portion of the set of assets 135 allocated to resilience. In some examples, the information regarding the set of connections may identify the amount of energy consumed due to the impedance of each connection of the set of connections.

In some examples, when identifying the set of assets 135, energy model 115 may identify a first asset 135 and determine whether a capacity of the first asset 135 (e.g., an amount of energy generated by the first asset 135) meets the electrical load. Energy model 115 may select an additional asset 135 until the capacities of the selected assets 135 meet the electrical load. In some examples, energy model 115 may select a solar panel, followed by a battery, followed by a generator, followed by another solar panel, and so on. The order for selecting assets 135 may be based on the user preferences.

In some implementations, when identifying the set of assets 135, energy model 115 may identify a battery based on the user preference regarding resilience. For example, energy model 115 may determine a storage state of the battery to determine whether the battery is storing a sufficient amount of energy to meet the user preference regarding resilience. Additionally, or alternatively, energy model 115 may identify the battery based on information regarding an availability of the battery. The information regarding the availability of the battery may indicate one or more best times to use the battery over a period of time.

In some implementations, when identifying the set of assets 135, energy model 115 may identify a generator based on information regarding the generator. The information regarding the generator may identify a current capacity of the generator (e.g., a maximum energy generating capacity of the generator), an availability of the generator (e.g., failure rates, maintenance times, regulatory limits on operation), the user preferences with respect to reducing cost and with respect to reducing carbon dioxide emissions, a cost schedule indicating a cost associated with fueling the generator, a mapping of the cost of using the generator with respect to time, and/or an amount of carbon dioxide produced by the microgrid.

Based on the information regarding the generator, energy model 115 may determine whether the cost associated with using the generator is within the budget identified by the sustainability budget information, whether the times to use the generator are consistent with its availability information, and whether the cost associated with reducing the carbon dioxide emission of the generator is within a value identified by an administrator. If energy model 115 determines that the generator does not comply with any of the factors mentioned above, energy model 115 may select another generator.

In some examples, energy model 115 may determine the operating states of the set of assets 135 for a first period of time (e.g., a five-minute period, a ten-minute period of time, among other examples). For example, the operating state of an asset 135 may indicate that the asset 135 is to generate energy during the first period of time. Energy model 115 may be configured to periodically redetermine the operating states of the set of assets 135 to ensure that the operating states are meeting (or are being updated to continue to meet) the user preferences and the electrical load. For example, the energy model may be configured to redetermine the operating states based on the first period of time (e.g., every five minutes, every ten minutes, among other examples).

As part of redetermining the operating states of the set of assets 135, energy model 115 may update the set of assets 135. In some instances, energy model 115 may determine the operating states and/or redetermine the operating states based on feedback from the microgrid. The feedback may include information regarding assets 135. The information regarding assets 135 may identify current operating states of assets 135, current capacities of assets 135 (e.g., amounts of energy stored by assets 135), current availability states of assets 135 (e.g., indicating whether assets 135 are experiencing a failure), among other examples of information that may be used to determine whether an asset 135 is to be used to generate energy. In some situations, the information regarding the assets may be used to update the long-term forecast for the capacities of assets 135.

Energy model 115 may use the updated information to provide, as an output, the operating states of assets 135 for a second period of time (e.g., a one-day period, a one-week period of time, among other examples). For example, energy model 115 may determine an expected charge level of a battery during the second period of time. In other words, energy model 115 may use the load forecast information to determine the operating states for shorter periods of time and use the storage and generator information to determine the operating states for longer periods of time.

As shown in FIG. 1D, and by reference number 180, energy optimization platform 110 may determine an optimized combination of the operating states of the assets. For example, optimization component 120 may obtain the output provided by energy model 115 and may optimize the output. For example, the set of assets 135 and the set of connections, identified in the output, may be provided as candidate assets and candidate connections. Optimization component 120 may determine an optimal combination of assets 135 from the set of assets 135. Optimization component 120 may determine a best way to use the set of assets 135 to generate energy that meets the electrical load while meeting the user preferences.

As an example, if the user preferences indicate a priority regarding reducing cost, optimization component 120 may select a combination of assets 135 (from the set of assets 135) that minimizes a cost associated with using assets 135. Alternatively, if the user preferences indicate a priority regarding sustainability, optimization component 120 may select a combination of assets 135 (from the set of assets 135) that minimizes an emission of carbon dioxide. Alternatively, if the user preferences indicate a priority regarding resilience, optimization component 120 may select a combination of assets 135 (from the set of assets 135) that maximizes resilience.

In some examples, when determining the optimal combination of assets 135, optimization component 120 may select an asset 135 in a manner similar to a manner in which energy model 115 selects an asset 135, as described above.

Figure 1E:
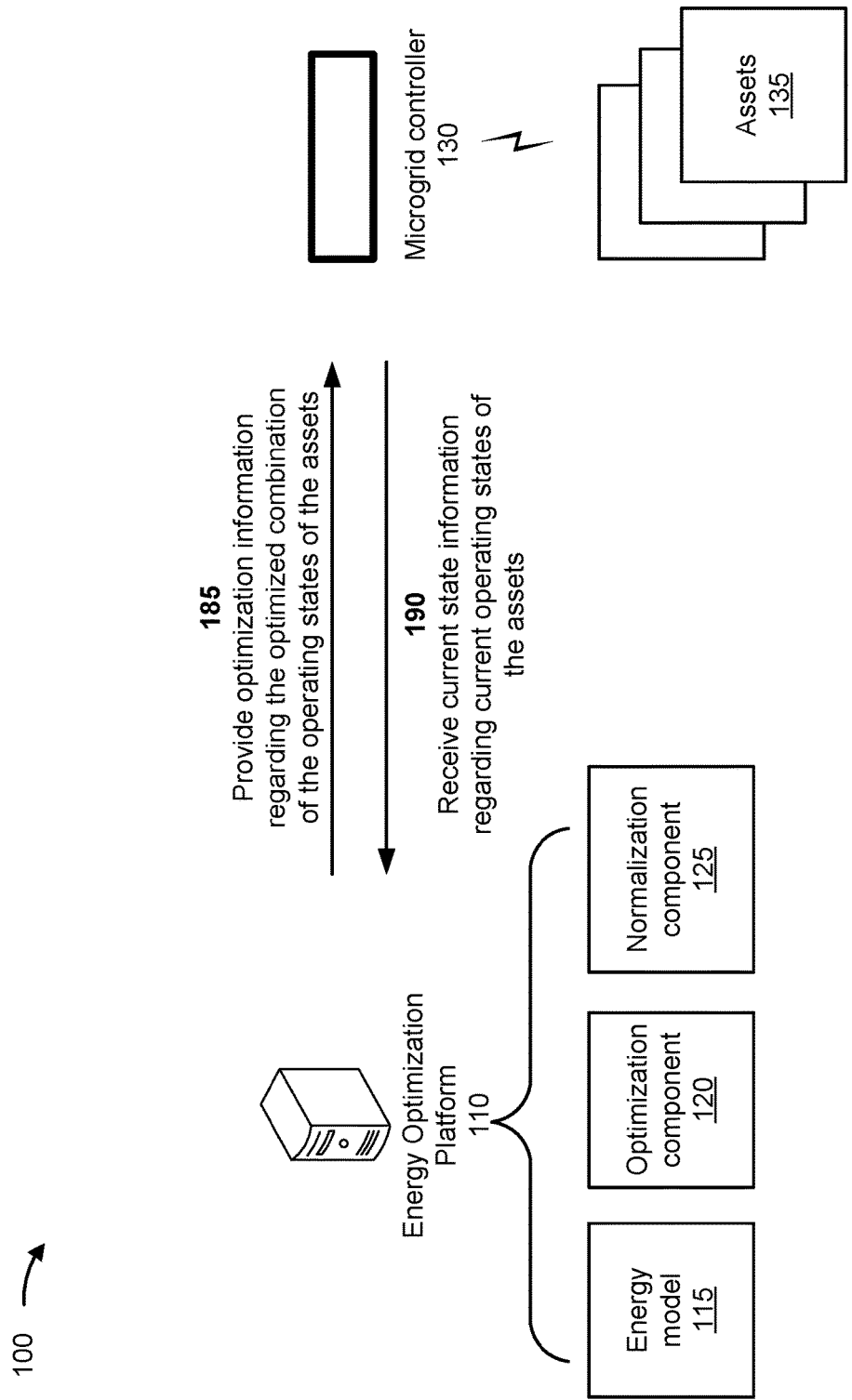

As shown in FIG. 1E, and by reference number 185, energy optimization platform 110 may provide optimization information regarding the optimized combination of the operating states of the assets. For example, energy optimization platform 110 may provide the optimization information to microgrid controller 130 to cause microgrid controller 130 to control operations of assets 135 identified by optimization component 120. In some implementations, energy optimization platform 110 may provide the optimization information using a microgrid hardware adaptor. The microgrid hardware adaptor may include one or more devices configured to communicate with different types of microgrid controllers.

As shown in FIG. 1E, and by reference number 190, energy optimization platform 110 may receive current state information regarding current operating states of the assets. In some implementations, microgrid controller 130 may provide the current state information to a data structure, and energy optimization platform 110 may obtain the current state information from the data structure. Energy optimization platform 110 may use the current state information as feedback inputs to the energy model to redetermine the operating states of assets 135, as explained herein.

By determining the operating states of the assets as described herein, implementations described herein may allow a microgrid to provide a desired amount of energy according to user preferences for cost, resiliency and environmental impact.

As indicated above, FIGS. 1A-1E are provided as an example. Other examples may differ from what is described with regard to FIGS. 1A-IE. The number and arrangement of devices shown in FIGS. 1A-IE are provided as an example. In practice, there may be additional devices, fewer devices, different devices, or differently arranged devices than those shown in FIGS. 1A-IE. Furthermore, two or more devices shown in FIGS. 1A-IE may be implemented within a single device, or a single device shown in FIGS. 1A-IE may be implemented as multiple, distributed devices. Additionally, or alternatively, a set of devices (e.g., one or more devices) shown in FIGS. 1A-1E may perform one or more functions described as being performed by another set of devices shown in FIGS. 1A-IE.

Figure 2:
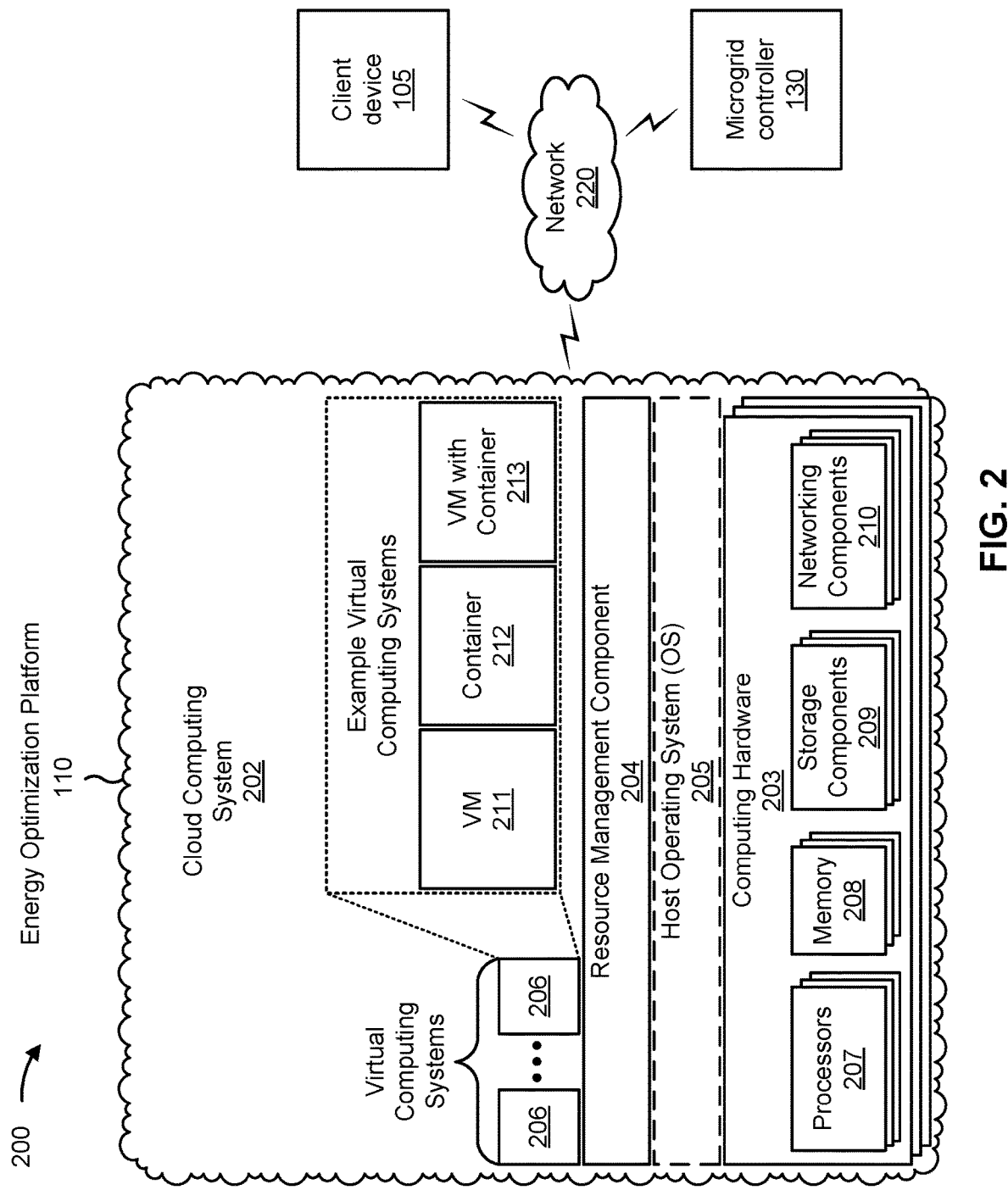
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include energy optimization platform 110, which may include one or more elements of and/or may execute within a cloud computing system 202. The cloud computing system 202 may include one or more elements 203-213, as described in more detail below. As further shown in FIG. 2, environment 200 may include a network 220, client device 105, and/or microgrid controller 130. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although energy optimization platform 110 may include one or more elements 203-213 of the cloud computing system 202, may execute within the cloud computing system 202, and/or may be hosted within the cloud computing system 202, in some implementations, energy optimization platform 110 may not be cloud-based (e.g., may be implemented outside of a cloud computing system) or may be partially cloud-based. For example, energy optimization platform 110 may include one or more devices that are not part of the cloud computing system 202, such as device 300 of FIG. 3, which may include a standalone server or another type of computing device (e.g., as part of one of the assets 135). In some implementations, one or more portions of the energy optimization platform 110 may be deployed to "edge" servers (e.g., as part of a multi-access edge computing (MEC) service). Energy optimization platform 110 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

Client device 105 includes one or more devices capable of receiving, generating, storing, processing, and/or providing information associated with optimizing energy usage based on user preferences, as described elsewhere herein. Client device 105 may include a communication device and a computing device. For example, the client device 105 may include a wireless communication device, a mobile phone, a user equipment, a laptop computer, a tablet computer, a desktop computer, or a similar type of device.

Microgrid controller 130 may include one or more devices configured to control operations of assets 135 of the microgrid. Microgrid controller may include special-purpose hardware to allow for communication with assets 135 to provide control information and receive operational data from assets 135 (e.g., using an industrial communications network, programmable logic controllers, device-specific point-to-point signaling, and the like). In some implementations, microgrid controller 130 may control the operations of assets 135 based on optimization information received from energy optimization platform 110, and provide current state information associated with the microgrid to energy optimization platform 110 based on operational data received from assets 135 or other operational data it may collect regarding the microgrid (e.g. environment sensor information, etc.).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
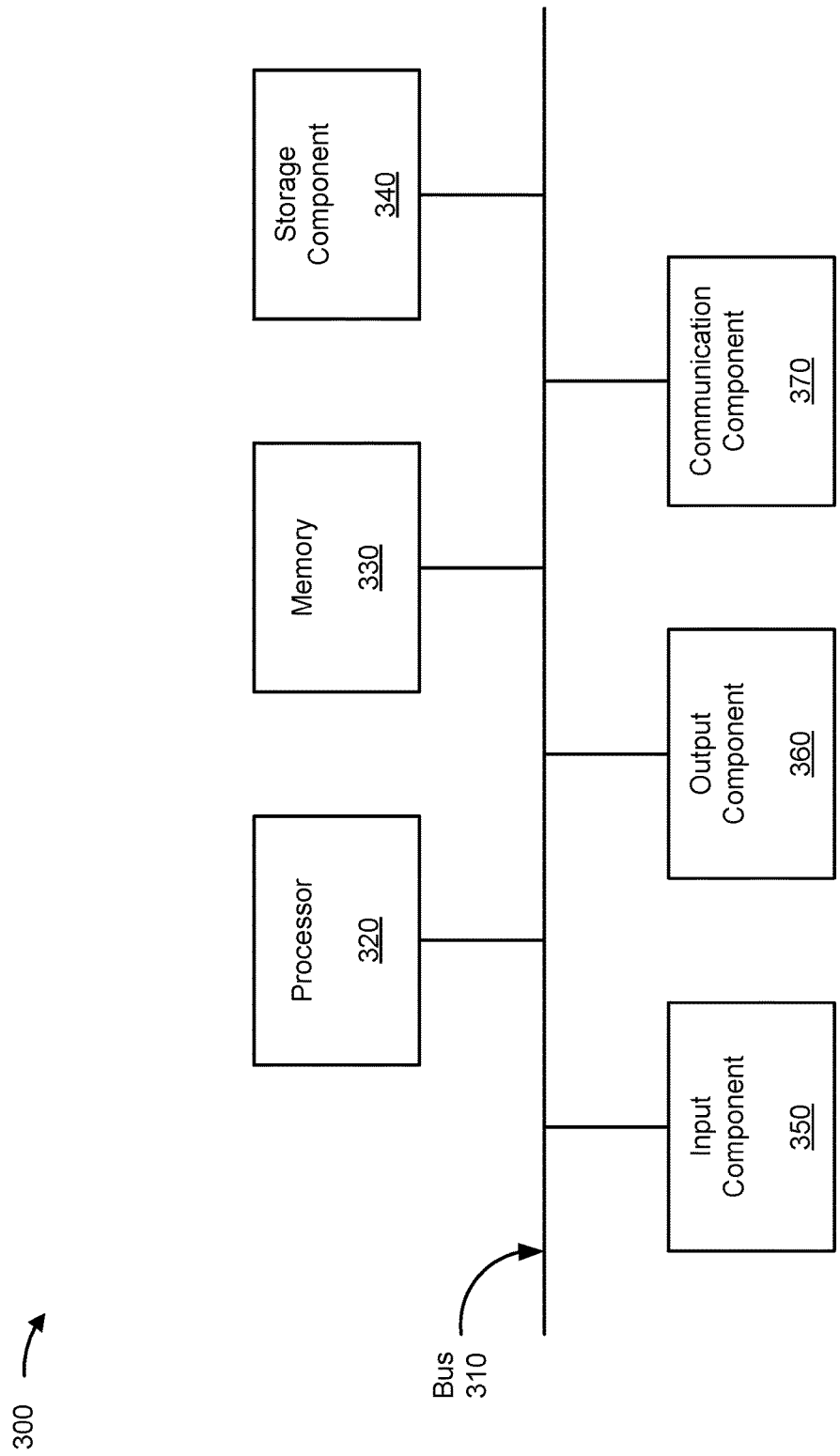
FIG. 3 is a diagram of example components of one or more devices of FIG. 2.

FIG. 3 is a diagram of example components of a device 300, which may correspond to energy optimization platform 110, client device 105, one or mor assets 135, and/or microgrid controller 130. In some implementations, energy optimization platform 110, client device 105, one or more assets 135, and/or microgrid controller 130 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 relating to optimizing energy usage based on user preferences. In some implementations, one or more process blocks of FIG. 4 may be performed by an energy optimization platform (e.g., energy optimization platform 110). In some implementations, one or more process blocks of FIG. 4 may be performed by another device or a group of devices separate from or including the energy optimization platform, such as a client device (e.g., client device 105), an asset 135, and/or a microgrid controller (e.g., microgrid controller 130). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving user preference information associated with operations of assets of a microgrid (block 410). For example, the energy optimization platform may receive user preference information associated with operations of assets of a microgrid. The user preference information identifies user preferences that include a cost preference regarding reducing cost, a sustainability preference regarding reducing an emission of carbon dioxide, and a resilience preference regarding a resilience against a power outage of a power grid. The assets include at least one of one or more solar panels, one or more generators, or one or more batteries, as described above. In some implementations, the user preference information identifies user preferences that include a cost preference regarding reducing cost, a sustainability preference regarding reducing an emission of carbon dioxide, and a resilience preference regarding a resilience against a power outage of a power grid.

As further shown in FIG. 4, process 400 may include receiving load forecast information regarding an electrical load (block 420). For example, the energy optimization platform may receive load forecast information regarding an electrical load, as described above.

As further shown in FIG. 4, process 400 may include providing the user preference information and the load forecast information as inputs to an energy model (block 430). For example, the energy optimization platform may provide the user preference information and the load forecast information as inputs to an energy model. The energy model predicts, as an output, operating states of the assets based on the user preference information and the load forecast information. An operating state of an asset indicates whether the asset is to generate energy to meet the user preferences and the electrical load, as described above.

As further shown in FIG. 4, process 400 may include determining an optimized combination of the operating states of the assets to meet the user preferences (block 440). For example, the energy optimization platform may determine an optimized combination of the operating states of the assets to meet the user preferences, as described above.

As further shown in FIG. 4, process 400 may include providing, to a microgrid controller, optimization information regarding the optimized combination of the operating states of the assets (block 450). For example, the energy optimization platform may provide, to a microgrid controller, optimization information regarding the optimized combination of the operating states of the assets. The optimization information is provided to cause the microgrid controller to control the operations of the assets based on the optimization information, as described above. The optimization information may be provided to facilitate control of the operations of the assets.

In some implementations, process 400 includes receiving cost information regarding costs associated with reducing an emission of carbon dioxide, receiving storage capacity information regarding one or more storage capacities of the one or more batteries, and providing the cost information and the storage capacity information as additional inputs to the energy model. The energy model predicts the operating states of the assets further based on the cost information and the storage capacity information.

In some implementations, process 400 includes normalizing the user preference information, the cost information, and the storage capacity information to obtain normalized information. The normalized information and the load forecast information are provided as inputs to the energy model.

In some implementations, process 400 includes obtaining current state information regarding current operating states of the assets. The current state information is provided by the microgrid controller. Process 400 further includes providing the current state information as an additional input to the energy model.

In some implementations, the energy model predicts the operating states of the assets for a first period of time. Process 400 further comprises receiving solar capacity information regarding a capacity of the one or more solar panels, receiving generator capacity information regarding a capacity of the one or more generators, receiving availability time information regarding availability times of the assets, and providing the solar capacity information, the generator capacity information, and the availability time information as inputs the energy model. The energy model predicts the operating states of the assets for a second period of time that exceeds the first period of time.

In some implementations, the load forecast information is determined based on historical electrical loads, a current weather condition, and historical weather conditions.

In some implementations, process 400 includes receiving resilience risk information regarding a risk tolerance with respect to the resilience, and providing the resilience risk information to the energy model. The energy model predicts the operating states of the assets further based on the resilience risk information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by an energy optimization platform, the method comprising:
   receiving user preference information associated with operations of assets of a microgrid,
      wherein the user preference information identifies user preferences that include a cost preference regarding reducing cost, a sustainability preference regarding reducing an emission of carbon dioxide, and a resilience preference regarding a resilience against a power outage of a power grid,
      wherein the user preference information identifies different values for the cost preference, the sustainability preference, and the resilience preference,
      wherein the different values identify different portions of a capacity of the assets to be used for the cost preference, the sustainability preference, and the resilience preference, and wherein the assets include at least one of one or more solar panels, one or more generators, or one or more batteries;
receiving load forecast information regarding an electrical load;
providing the user preference information and the load forecast information as inputs to an energy model,
wherein the energy model predicts, as an output, operating states of the assets based on the user preference information and the load forecast information, and
wherein an operating state of an asset indicates whether the asset is to generate energy to meet the user preferences and the electrical load;
determining an optimized combination of the operating states of the assets to meet the user preferences; and
providing, to a microgrid controller, optimization information regarding the optimized combination of the operating states of the assets,
wherein the optimization information is provided to cause the microgrid controller to control the operations of the assets based on the optimization information.

2. The method of claim 1, further comprising:
receiving cost information regarding costs associated with reducing an emission of carbon dioxide;
receiving storage capacity information regarding one or more storage capacities of the one or more batteries; and
providing the cost information and the storage capacity information as additional inputs to the energy model,
wherein the energy model predicts the operating states of the assets further based on the cost information and the storage capacity information.

3. The method of claim 2, further comprising:
normalizing the user preference information, the cost information, and the storage capacity information to obtain normalized information,
wherein the normalized information and the load forecast information are provided as inputs to the energy model.

4. The method of claim 1, further comprising:
obtaining current state information regarding current operating states of the assets,
wherein the current state information is provided by the microgrid controller; and
providing the current state information as an additional input to the energy model.

5. The method of claim 1, wherein the energy model predicts the operating states of the assets for a first period of time, and
wherein the method further comprises:
receiving solar capacity information regarding a capacity of the one or more solar panels;
receiving generator capacity information regarding a capacity of the one or more generators;
receiving availability time information regarding availability times of the assets; and
providing the solar capacity information, the generator capacity information, and the availability time information as inputs the energy model,
wherein the energy model predicts the operating states of the assets for a second period of time that exceeds the first period of time.

6. The method of claim 1, wherein the load forecast information is determined based on historical electrical loads, a current weather condition, and historical weather conditions.

7. The method of claim 1, further comprising:
receiving resilience risk information regarding a risk tolerance with respect to the resilience,
wherein the risk tolerance indicates an amount by which a portion of a charge capacity of an asset, reserved for use during the power outage, is to be reduced or reallocated; and
providing the resilience risk information to the energy model,
wherein the energy model predicts the operating states of the assets further based on the resilience risk information.

8. A device, comprising:
one or more processors configured to:
receive user preference information associated with operations of assets of a microgrid,
wherein the user preference information identifies user preferences that include a cost preference regarding reducing cost, a sustainability preference regarding reducing an emission of carbon dioxide, and a resilience preference regarding a resilience against a power outage,
wherein the user preference information identifies a first value for the cost preference, a second value for the sustainability preference, and a third value for the resilience preference,
wherein the first value, the second value, and the third value identify different portions of a capacity of the assets to be used for the cost preference, the sustainability preference, and the resilience preference, and
wherein the assets include one or more solar panels, one or more generators, or one or more batteries;
provide the user preference information as an input to an energy model,
wherein the energy model predicts, as an output, operating states of the assets based on the user preference information, and
wherein an operating state of an asset indicates whether the asset is to be used to generate energy to meet the user preferences;
determine an optimized combination of the operating states of the assets to obtain an optimized combination of the operating states of the assets to meet the user preferences; and
provide, to a microgrid controller of the microgrid, optimization information regarding the optimized combination of the operating states of the assets,
wherein the optimization information is provided to the microgrid controller to cause the microgrid controller to control the operations of the assets based on the optimization information.

9. The device of claim 8, wherein the one or more processors are further configured to:
receive load forecast information regarding an electrical load; and
provide the load forecast information as an input to the energy model,
wherein the energy model predicts the operating states of the assets further based on the load forecast information.

10. The device of claim 8, wherein the one or more processors are further configured to:
receive sustainability budget information regarding a budget for reducing the emission of carbon dioxide; and
provide the sustainability budget information as an input to the energy model, wherein the energy model predicts the operating states of the assets further based on the sustainability budget information.

11. The device of claim 8, wherein the first value, the second value, and the third value identify different priorities for the cost preference, the sustainability preference, and the resilience preference,
wherein the first value, the second value, and the third value indicate that a first user preference of the user preferences is to be prioritized over a second user preference of the user preferences, and
wherein the energy model predicts the operating states of the assets further based on the first user preference being prioritized over the second user preference.

12. The device of claim 8, wherein the one or more processors are further configured to:
receive cost information regarding costs associated with reducing an emission of carbon dioxide;
receive storage capacity information regarding one or more storage capacities of the one or more batteries; and
provide the cost information and the storage capacity information as additional inputs to the energy model,
wherein the energy model predicts the operating states of the assets further based on the cost information and the storage capacity information.

13. The device of claim 12, wherein the one or more processors are further configured to:
normalize the user preference information, the cost information, and the storage capacity information to obtain normalized information,
wherein the normalized information is provided as an input to the energy model.

14. The device of claim 8, wherein:
the energy model is a heuristic model, or
the energy model is a machine learning model.

15. A non-transitory computer-readable medium storing a set of instructions, the set of instructions comprising:
one or more instructions that, when executed by one or more processors of a device, cause the device to:
receive user preference information associated with operations of assets of a microgrid,
wherein the user preference information identifies user preferences that include a cost preference regarding reducing cost associated with the operations, a sustainability preference regarding reducing an emission of carbon dioxide during the operations, and a resilience preference regarding a resilience against a power outage,
wherein the user preference information identifies different values for the cost preference, the sustainability preference, and the resilience preference,
wherein the different values identify different portions of a capacity of the assets to be used for the cost preference, the sustainability preference, and the resilience preference, and
wherein the assets include one or more solar panels, one or more generators, or one or more batteries;
provide the user preference information as an input to an energy model,
wherein the energy model predicts, as an output, operating states of the assets based on the user preference information, and
wherein an operating state of an asset indicates whether the asset is to be used to generate energy to meet the user preferences;
determine an optimized combination of the operating states of the assets to obtain an optimized combination of the operating states of the assets to meet the user preferences; and
provide, to a microgrid controller of the microgrid, optimization information regarding the optimized combination of the operating states of the assets to facilitate control of the operations of the assets.

16. The non-transitory computer-readable medium of claim 15, wherein the one or more instructions, when executed by the one or more processors, further cause the device to:
receive additional information that includes one or more of:
cost information regarding costs associated with reducing an emission of carbon dioxide,
storage capacity information regarding one or more storage capacities of the one or more batteries;
resilience risk information regarding a risk tolerance with respect to the resilience;
sustainability budget information regarding a budget for reducing the emission of carbon dioxide; and
provide the additional information as additional inputs to the energy model,
wherein the energy model predicts the operating states of the assets further based on the additional information.

17. The non-transitory computer-readable medium of claim 16, wherein the one or more instructions, when executed by the one or more processors, further cause the device to:
normalize the user preference information and the additional information to obtain normalized information,
wherein the normalized information is provided as an input to the energy model.

18. The non-transitory computer-readable medium of claim 15, wherein the user preference information indicates that a first user preference of the user preferences is to be prioritized over a second user preference of the user preferences,
wherein the one or more instructions, when executed by the one or more processors, further cause the device to:
determine a first factor for the first user preference and a second factor for the second user preference based on the first user preference being prioritized over the second user preference, and
wherein the energy model predicts the operating states of the assets further based on the first factor and the second factor.

19. The non-transitory computer-readable medium of claim 15, wherein the one or more instructions, when executed by the one or more processors, further cause the device to:
receive load forecast information regarding an electrical load; and
provide the load forecast information as an input to the energy model,
wherein the energy model predicts the operating states of the assets further based on the load forecast information.

20. The non-transitory computer-readable medium of claim 15, wherein:
the energy model is a heuristic model, or
the energy model is a machine learning model.

* * * * *